(12) United States Patent
Kruglick

(10) Patent No.: US 8,941,363 B2
(45) Date of Patent: Jan. 27, 2015

(54) DEVICE BATTERY MANAGEMENT

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 505 days.

(21) Appl. No.: 13/264,710

(22) PCT Filed: May 27, 2011

(86) PCT No.: PCT/US2011/038353
§ 371 (c)(1),
(2), (4) Date: Oct. 14, 2011

(87) PCT Pub. No.: WO2012/166095
PCT Pub. Date: Dec. 6, 2012

(65) Prior Publication Data
US 2012/0299554 A1 Nov. 29, 2012

(51) Int. Cl.
*H02J 7/00* (2006.01)
*G06F 1/26* (2006.01)

(52) U.S. Cl.
CPC ............ *H02J 7/008* (2013.01); *H02J 7/0073* (2013.01); *H02J 7/00* (2013.01); *G06F 1/26* (2013.01); *H02J 2007/0096* (2013.01)
USPC ....................................... 320/160

(58) Field of Classification Search
USPC ....................................... 320/160
See application file for complete search history.

(56) References Cited

U.S. PATENT DOCUMENTS

| | | | | |
|---|---|---|---|---|
| 5,642,032 A | * | 6/1997 | Kokuga | 320/148 |
| 5,670,863 A | * | 9/1997 | Broell et al. | 320/145 |
| 5,710,506 A | * | 1/1998 | Broell et al. | 320/145 |
| 5,751,134 A | * | 5/1998 | Hoerner et al. | 320/124 |
| 5,859,524 A | * | 1/1999 | Ettes | 320/132 |
| 6,771,042 B2 | * | 8/2004 | Chen et al. | 320/110 |
| 7,191,077 B2 | | 3/2007 | Mese et al. | |
| 7,391,183 B2 | * | 6/2008 | Ariga et al. | 320/125 |
| 7,633,265 B2 | * | 12/2009 | Matsushima et al. | 320/134 |
| 2008/0218126 A1 | | 9/2008 | Bansal et al. | |
| 2009/0243549 A1 | | 10/2009 | Matsumura et al. | |
| 2010/0161149 A1 | | 6/2010 | Nguyen et al. | |
| 2011/0057603 A1 | | 3/2011 | Marty et al. | |

FOREIGN PATENT DOCUMENTS

JP   2005-323494   11/2005

OTHER PUBLICATIONS

United States Patent and Trademark Office, International Search Report and Written Opinion of the International Searching Authority for PCT/US11/38353, prepared on Aug. 25, 2011 and mailed on Sep. 2, 2011, United States.
Battery University, How to prolong lithium-based batteries, 2010, accessed online on Oct. 11, 2011 via http://batteryuniversity.com/learn/article/how_to_prolong_lithium_based_Batteries.
Battery University, Charging lithium-ion batteries, 2010, accessed online on Oct. 11, 2011 via http://batteryuniversity.com/index.php/learn/article/charging_lithium_ion_batteries.

(Continued)

*Primary Examiner* — M'Baye Diao

(57) ABSTRACT

Technologies and implementations for device battery management are generally disclosed.

30 Claims, 5 Drawing Sheets

(56) References Cited

OTHER PUBLICATIONS

Kennemer, Quentyn, Your smartphone's battery gauge is lying of you (and it's not such a bad thing), Dec. 25, 2010, Phandroid Android Phone Fans, accessed online on Oct. 11, 2011 via http://phandroid.com/2010/12125/your-smartphones-battery-gauge-is-lying-to-you-and-its-not-such-a-bad-thing/.

Androidcentral, Do you "bump charge" and if so, what is your "routine"?, Android Central Forum, discussion beginning on Jun. 23, 2010, accessed online on Oct. 11, 2011 via http://forums.androidcentral.com/verizon-droid-incredible/19018-do-you-bump-charge-if-so-what-your-routine-3.html.

Purdy, Kevin, Universal phone chargers coming to Europe in 2011; U.S. still annoying, Dec. 30, 2010, accessed online on Oct. 11, 2011 via http://lifehacker.com/5721298/universal-phone-chargers-coming-to-europe-in-2011-us-still-annoying.

* cited by examiner

600 A computer program product

602 A signal bearing medium 604 at least one of one or more instructions for formatting data to provide a charge to a device battery via a device charger, wherein the charge provided to the device battery is less than a full charge capacity of the device battery;

one or more instructions for formatting data to determine a device battery top off charge trigger associated with the device and the device battery; or one or more instructions for formatting data to provide a top off charge to the device battery in response to the device battery top off charge trigger.

| 606 a computer-readable medium | 608 a recordable medium | 610 a communications medium |

Fig. 6

DEVICE BATTERY MANAGEMENT

BACKGROUND

Unless otherwise indicated herein, the approaches described in this section are not prior art to the claims in this application and are not admitted to be prior art by inclusion in this section.

Electronic devices may include rechargeable batteries. In some instances, maintaining the device battery at full charge during recharging may reduce the useful lifetime of the battery. To address this problem, the battery may be maintained at less than a full charge while coupled to the charger. In some examples, the device may show a full charge (i.e., display a 100% charge to the user) while the battery is in fact at, for example, 85 to 90% of full charge. Such implementations may maintain the useful life of the device battery but they may provide shorter use time of the electronic device between battery recharges.

SUMMARY

The present disclosure describes example methods for providing battery management for a device. Example methods for a device that has a device battery and is electrically coupled to a device charger may include providing a charge to the device battery that is less than a full charge capacity of the device battery via the device charger, determining a device battery top off charge trigger associated with the device and the device battery, and providing a top off charge to the device battery in response to the device battery top off charge trigger. Example methods for a smart charger to provide battery management for a device coupled to the smart charger may include providing a charge to a battery of the device that is less than a full charge capacity of the battery, determining a battery top off charge trigger associated with the device and the battery, and providing a top off charge to the device battery in response to the device battery top off charge trigger. Example methods for a device to provide battery management to a charging device electrically coupled to the device may include providing a charge to a battery of the charging device that is less than a full charge capacity of the battery, determining a battery top off charge trigger associated with the charging device and the battery, and providing a top off charge to the device battery in response to the device battery top off charge trigger.

The present disclosure also describes example machine readable non-transitory media having stored therein instructions that, when executed, provide battery management by providing a charge to the device battery that is less than a full charge capacity of the device battery via the device charger, determining a device battery top off charge trigger associated with the device and the device battery, and providing a top off charge to the device battery in response to the device battery top off charge trigger.

The present disclosure also describes example devices. The devices may include a device battery, a device charger configured to be electrically coupled to the device, a processor and a machine readable medium having stored therein instructions that, when executed by the processor, cause the device to provide battery management by providing a charge to the device battery that is less than a full charge capacity of the device battery via the device charger, determining a device battery top off charge trigger associated with the device and the device battery, and providing a top off charge to the device battery in response to the device battery top off charge trigger.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 is an illustration of an example computer program product; and

DETAILED DESCRIPTION

Figure 1:
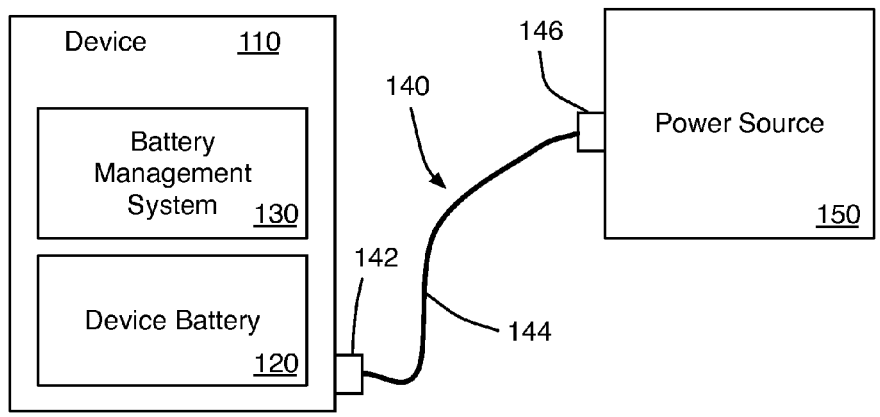
FIG. 1 is an illustration of a block diagram of an example system that may provide battery management.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing device battery management.

In some examples, device battery management may provide for a fully or substantially fully charged battery for use between battery recharges while maintaining the useful life of the device battery. In some battery implementations, such as, for example, lithium-ion batteries, the battery may degrade and lose lifespan if the battery is maintained on a full charge during recharges, particularly when left on a charger for long durations such as during a workday or overnight. In some examples discussed herein, during recharging, the battery may be maintained at a charge that is less than a full capacity of the battery such that the lifespan of the battery may be substantially maintained. To provide a recharged battery to the user that may be substantially fully charged, a trigger may be determined that indicates the device may soon be removed from the charger. In response to the trigger, the battery may be topped off to a substantially full charge or at least a charge that is greater than the lifetime maintaining charge at which the battery is maintained during recharging. The battery top off trigger may be determined in any suitable manner such as, for example, using past charger removals to determine a likely removal time or an on-charger duration time, an indication from, for example, the user, indicating the user will soon remove the charger or that the user may be requesting a top off charge, a query for battery top off to the user and an affirmation to the query, or the like. Such techniques may provide for a substantially long battery lifespan and improved charge levels for users between recharging. The improved charge levels may increase the available use time of the device between recharges or the increased charge levels may be used to downsize the device battery to decrease the size and weight of the device. Such techniques may also provide for a tradeoff to be made between battery lifespan (limiting top off charging) and charge level between recharging (using aggressive top off charging).

FIG. 1 is an illustration of a block diagram of an example system 100 that may provide battery management, arranged in accordance with at least some embodiments of the present disclosure. System 100 may include a device 110 having a device battery 120 and a battery management system 130, a device charger 140 having a coupler 142, a cord 144, and a coupler 146, and a power source 150. Device 110 may include any suitable device that may include device battery 120. In some examples, device 110 may be a mobile phone, a smartphone, a tablet device, a laptop computer, a global positioning system (GPS) device, an electronic watch, or the like. In some examples, device 110 may include an electric or hybrid vehicle, or the like. Device battery 120 may include any rechargeable battery. In some examples, device battery 120 may include a rechargeable battery that may degrade over its useful life. In some examples, device battery 120 may be a lithium-ion battery, a lithium-ion polymer battery, a nickel-metal hydride battery, a nickel-cadmium battery, or the like. In some examples, device battery 120 may degrade due to a dendrite growth within the battery. In some examples, the degradation of device battery 120 may be more rapid when device battery 120 is maintained at a full or a substantially full charge.

Battery management system 130 may be implemented in any suitable manner. In some examples, battery management system 130 may be implemented as a hardware module. In some examples, battery management system 130 may be implemented at the operating system level. In some examples, battery management system 130 may be implemented in software. In some examples, battery management system 130 may be implemented as a software function call via an application programming interface (API). In some examples, battery management system 130 may be implemented as a part of a power management system of device 110. As is discussed further herein, in some examples, device 110 may include a processor and instructions stored in a machine readable medium coupled to the processor. When executed, the instructions may cause the device to provide battery management by any of the techniques discussed herein.

In general, device charger 140 may include any suitable device charger that may provide electrical coupling between device 110 and power source 150. In some examples, device charger may include a power transformer between power source 150 and device 110. In some examples, device charger 140 may couple power source 150 and device 110. In some examples, device charger 140 may include a docking station or a docking pad for device 110. In some examples, coupler 142 and/or coupler 146 may include a universal serial bus (USB) adapted coupler. As shown, in some examples, device charger 140 may include a cord 144. In other examples, device charger 140 may be a wireless charger. In some examples, the device charger 140 may be an embedded wireless charger such that the wireless charger may be embedded in a desk, for example. Power source 150 may include any suitable power source that may provide power to recharge device battery 120. In some examples, power source 150 may include a residential power source and coupler 146 may provide coupling to an outlet. In some examples, device charger 140 may be a car charger and power source 150 may be an automobile or truck or the like. In some examples, power source 150 may be another device such as for example, a laptop computer, a desktop computer, a server, or the like. In some examples, device charger 140 may provide communication between device 110 and power source 150 in addition to providing power transmission between them.

Figure 2:
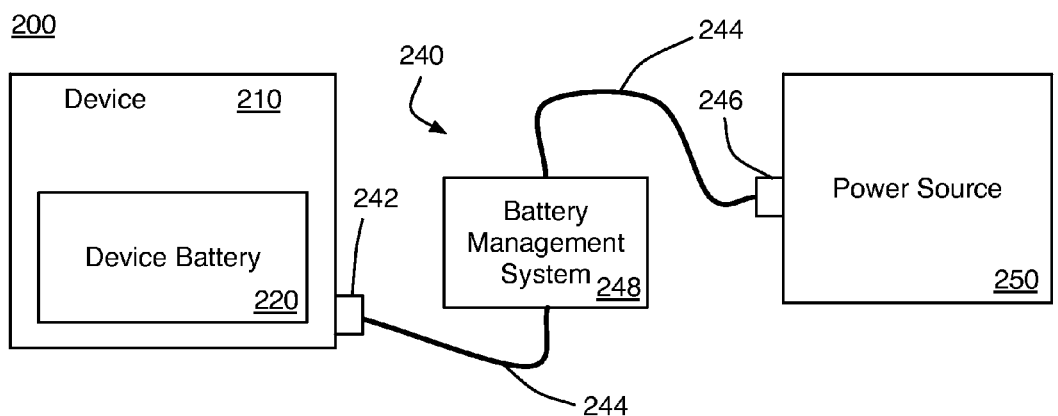
FIG. 2 is an illustration of a block diagram of an example system that may provide battery management.

FIG. 2 is an illustration of a block diagram of an example system 200 that may provide battery management, arranged in accordance with at least some embodiments of the present disclosure. System 200 may include a device 210 having a device battery 220, a device charger 240 having a coupler 242, a cord 244, a battery management system 248, and a coupler 246, and a power source 250. Device 210 may include any suitable device that may include device battery 220. In some examples, device 210 may be a mobile phone, a smartphone, a tablet device, a laptop computer, a global positioning system (GPS) device, an electronic watch, or the like. Device battery 220 may include any rechargeable battery such as any of those discussed with respect to FIG. 1 or elsewhere herein. As shown, in some examples, device 210 may not include a battery management system. In other examples, device 210 may optionally include a battery management system as discussed with respect to FIG. 1.

In general, device charger 240 may include any suitable device charger that may provide coupling between device 210 and power source 250 and that may provide battery management as discussed herein. In some examples, device charger 240 may be a smart charger such that it may provide the battery management techniques as discussed herein. As discussed, in some examples, device charger 240 may be coupled to device 210 including device battery 220. In other examples, device charger may be coupled directly to device battery 220 such that device battery 220 may not be incorporated or housed in device 210 during charging. As shown, in some examples, device charger 240 may include a cord 244. In other examples, device charger 140 may be a wireless charger. Battery management system 248 may be implemented in any suitable manner such that the battery management techniques discussed herein may be implemented for device 210. In some examples, battery management system 248 may include a processor, a memory, and a charge regulator. The charge regulator may regulate the charging current provided to device 210 such that the charging techniques discussed herein may be implemented for device 210. In various examples, battery management system 248 may be implemented as hardware, firmware, or software. In some examples, battery management system 248 may include a processor and instructions stored in a machine readable medium coupled to the processor. When executed, the instructions may cause the device to provide battery management for device 210 by any of the methods discussed herein. Device charger 240 may optionally include other components discussed herein for implementation of the battery management techniques discussed herein such as, for example, a light sensor, a microphone, or networking subsystems.

In some examples, device charger 240 may include a docking station or a docking pad for device 210. In some examples, device charger 240 may be device specific for device 210 such that device charger 240 may only work with devices of the same type as device 210. Such implementations may offer the advantage of providing device specific and customizable protocols suitable for device 210. In other examples, device charger 240 may be a generic device charger suitable to substantially any device. In some examples, coupler 242 and/or coupler 246 may include a universal serial bus (USB) adapted coupler. In some examples, device charger 240 may be implemented as a car charger. Power source 250 may include any suitable power source. In some examples, power source 250 may include a residential power source and coupler 246 may provide coupling to an outlet. In some examples, power source 250 may be another device such as for example, a laptop computer, a desktop computer, a server, or the like. In some examples, device charger 240 may provide communication between device 210 and power source 250 in addition to providing power transmission between them.

Figure 3:
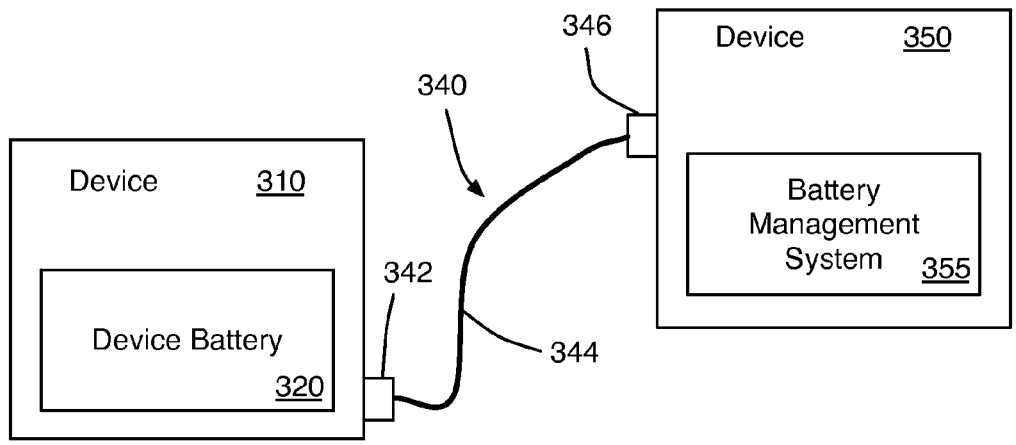
FIG. 3 is an illustration of a block diagram of an example system that may provide battery management.

FIG. 3 is an illustration of a block diagram of an example system 300 that may provide battery management, arranged in accordance with at least some embodiments of the present disclosure. System 300 may include a device 310 having a device battery 320, a device charger 340 having a coupler 342, a cord 344, and a coupler 346, and a device 350 having a battery management system 355. In some examples, coupler 342 and/or coupler 346 may include a universal serial bus (USB) adapted coupler. Device 310 may include any suitable device that may include device battery 320. In some examples, device 310 may be a mobile phone, a smartphone, a tablet device, a laptop computer, a global positioning system (GPS) device, an electronic watch, or the like. In some examples, device 310 may be a hybrid or electric vehicle, or the like. Device battery 320 may include any rechargeable battery such as any of those discussed with respect to FIG. 1 or elsewhere herein. As shown, in some examples, device 310 may not include a battery management system. In other examples, device 310 may optionally include a battery management system as discussed with respect to FIG. 1.

In general, device charger 340 may include any suitable device charger that may provide electrical coupling between device 310 and device 350 such as those discussed with respect to FIG. 1 or elsewhere herein. In some examples, device charger 340 may include a docking station or a docking pad for device 310. As shown, in some examples, device charger 340 may include a cord 344. In other examples, device charger 340 may be a wireless charger. Device 350 may include any suitable device that may provide power to recharge device battery 320 of device 310 and implement battery management system 355. In some examples, device 350 may be a laptop computer, a desktop computer, a server, or the like. In some examples, device charger 340 may provide communication between device 310 and device 350 in addition to providing power transmission between them.

Battery management system 355 may be implemented in any suitable manner. In some examples, battery management system 355 may be implemented as a hardware module. In some examples, battery management system 355 may be implemented at the operating system level. In some examples, battery management system 355 may be implemented in software. As is discussed further herein, in some examples, device 355 may include a processor and instructions stored in a machine readable medium coupled to the processor. When executed, the instructions may cause the device to provide battery management by any of the methods discussed herein.

Figure 4:
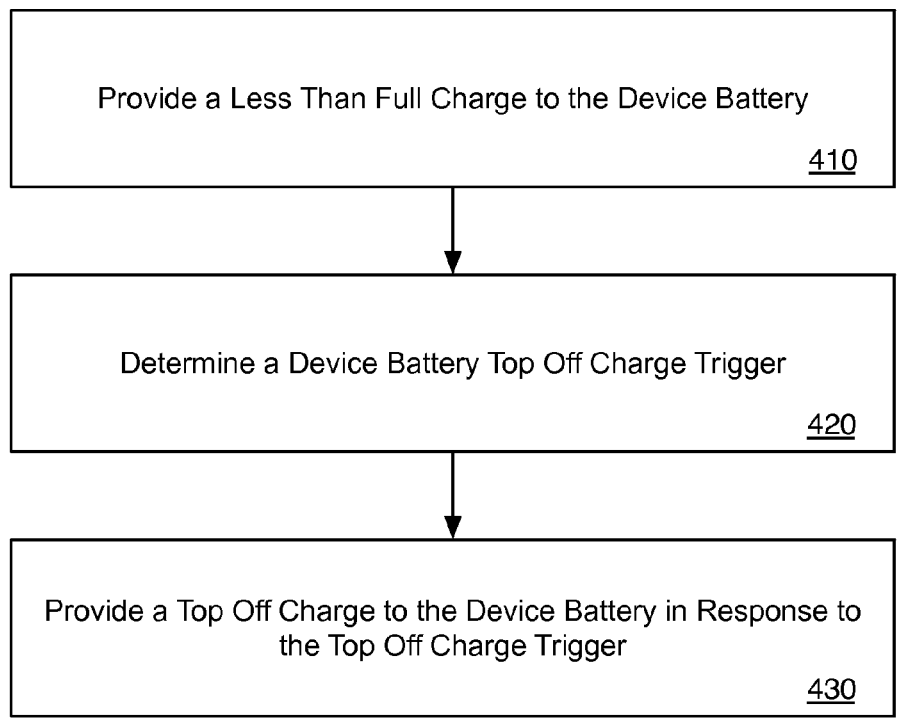
FIG. 4 is an illustration of a flow chart of an example method for providing battery management.

FIG. 4 is an illustration of a block diagram of an example method 400 for providing battery management for a device, arranged in accordance with at least some embodiments of the present disclosure. In general, the method of FIG. 4 may be performed by any suitable device such as device 110, device charger 240, device 350, or any device discussed herein. Therefore, in various examples, method 200 may be provided for a device by the device itself, a smart charger, or another device to which the charging device is coupled, or the like. Method 400 may include one or more functions, operations or actions as illustrated by one or more of blocks 410, 420, and/or 430. The process of method 400 may begin at block 410.

At block 410, "Provide a Less Than Full Charge to the Device Battery", a device battery being charged may be provided a charge that may be less than a full charge capacity of the device battery. In some examples, the charge to the device battery may be controlled by the device itself. In general, the charge provided to the device battery may be any suitable charge such that the charge may be less than a full charge capacity. As discussed, the less than full charge at the device battery may maintain the battery life of the device battery.

In some examples, the provided charge may be a fraction of the full charge capacity of the battery. In some examples, the provided charge may be 80 to 85% of full charge capacity. In some examples, the provided charge may be 85 to 90% of full charge capacity. In some examples, the provided charge may be 90 to 95% of full charge capacity. The provided charge may be substantially the same with each recharge of the battery or it may be different. In some examples, the provided charge may be determined by the user. In some examples, the charge may be inputted by the user directly (e.g., the user may indicate a less than fully charge capacity percentage or fraction). In other examples, the user may provide a user profile or user setting or settings to the device such as a charge aggressiveness level or a battery life maintenance preference, or the like. In some examples, the provided charge may be determined based on factors such as how long the battery has been in operation (a battery in operation parameter), how long the battery is typically charged for (a battery charge duration parameter), how frequently the battery is charged (a battery recharge frequency parameter), or the like.

In some examples, the device battery may be brought directly to the desired charge at which the device battery may be maintained. Such implementations may offer the advantage of a greater maintenance of the device battery life. In other examples, the device battery may be brought to a full or substantially full charge and the device may be run on the device battery (while being coupled to a charger) such that the device battery may fall the desired charge at which the device battery may be maintained. Such implementations may offer the advantage that, when the battery may be removed prior to an expected removal time, the battery may have a greater charge for use by the user. Method 400 may continue at block 420.

At block 420, "Determine a Device Battery Top Off Charge Trigger", a battery top off trigger may be determined. The top off trigger may provide any suitable indication such that a top off charge may be provided to the device battery. In some examples, the top off trigger may trigger the start of a top off charge to the device battery. The battery may begin to charge to a full or substantially full charge and maintain that charge until the device may be removed from the charger by a user. In some examples, the top off trigger may start a count down timer such that the top off charge begins after the count down may be complete. In some examples, the top off trigger may provide an early indication or warning before the device is expected to be decoupled from the device charger. In such examples, the top off charge may be started at any suitable time based on the trigger. In some examples, the top off charge may be started based on an estimated time to full charge of the battery.

In general, the top off charge trigger may be determined using any suitable techniques. In some examples, determining the device battery top off charge trigger may include predicting a removal time of the device from the device charger and providing the device battery top off charge trigger at a time before the predicted removal time of the device. Such examples may use any suitable user activity prediction techniques. The user prediction techniques may track user events and predict when a user may decouple the device from the device charger. In some examples, the removal time may be predicted based on past behavior such that the removal time may be based on a previous removal time or times of the device from the device charger. In some examples, a pattern of past behavior may be based on a common time for removal of the device from the charger. For example, a user may decouple a device from a device charger each workday morning at about the same time before departing for work and/or at the end of each workday before departing for home. Such techniques may account for the user's workweek and weekend or off days, for example. In some examples, determining the device battery top off charge trigger may include predicting a removal time of the device from the device charger and providing the device battery top off charge trigger at a time before the predicted removal time of the device.

In some examples, determining the device battery top off charge trigger may include predicting an on-charger duration that may indicate how long a user typically keeps the device from the charger. Based on the predicted on-charger duration, a device battery top off charge trigger may be provided at a time before the on-charger duration has expired. For example, some users may not wake or leave for work at a predictable time (such that an accurate removal time may be predicted), but they may charge their device for a predictable duration of time (such that an on-charger duration may be predicted), such as the duration of a night's sleep, a work shift, a car ride, or the like.

In some examples, determining the device battery top off charge trigger may include determining a proximity to a destination. In such examples, the device may be coupled to a car charger. As the device approaches a destination, the device may provide a top off charge trigger to bring the device to a full or substantially full charge as discussed herein. In some examples, the destination may be preset by a user (e.g., by setting a final destination while getting driving directions). In other examples, the destination may be a repeat destination (i.e., home, work, or the like) that the device may recognize and save for use in the top off charge techniques discussed herein. As is discussed further herein, a global positioning system (GPS) of the device may track the device location to determine proximity to the destination location. In some examples, when the device is within a certain distance or predicted time of arrival at the destination, the top off charge trigger may be implemented to begin the top off charge or begin a count down timer to a start time of the top off charge.

In some examples, determining the device battery top off charge trigger may include receiving or determining an indicator at the device. In some examples, the indicator may be determined based on an activity at the device. For example, a user may shut down an email applications shortly before the end of a workday. In other examples, a user may close all or most applications shortly before the end of a workday. In some examples, a user may check a website for directions or weather or the like before heading to or from work. Such behaviors may be monitored to determine a top off charge trigger to provide battery management using the techniques discussed herein.

In some examples, the indicator may be determined at a device sensor. For example, for some users, the device may be removed from the device charger after the occurrence of a sensed event. In some examples, the sensor may be a light sensor. In some examples, the sensor may be a microphone. For example, the user may remove the device from the charger after an alarm sounds and the indicator may be based on the detection of an audio alarm. In another example, the user may typically remove the device from the charger after the lights in the room with the device may be turned on and the indicator may be based on the detection of the lights being turned on. In general, the indicator may be implemented using any suitable techniques. In some examples, the indicator may be an electrical signal communicated over a bridge within the device. In some examples, the indicator may include a register setting command. The register setting command may set a register within the device to indicate the device battery may be top off charged in any manner as discussed herein.

In some examples, determining the device battery top off charge trigger may include receiving an indicator from a networked device communicatively coupled with the device. In general, the device may be networked with and be in communication with a variety of devices. In some examples, the device may be in communication with a ubiquitous computing device. In some examples, ubiquitous computing devices may communicate using a standard protocol such as, for example, the Microsoft Windows SideShow standard. In some examples, the device may be in communication with a kitchen appliance such as, a refrigerator, a coffee maker, or a microwave, a bar code reader, or a radio-frequency identification (RFID) reader, or any device discussed herein. In some examples, the device may receive an indicator from any of such devices indicating an activity has occurred. The activity may be related with the user removing the device from the device charger after the occurrence of the activity. For example, a refrigerator may communicate that the refrigerator door has been opened and, based on past occurrences, the device may predict the user may soon remove the device from the device charger and begin a top off charge as discussed herein. In general, any indicator that may be related to a predictable removal of the device from the device charger may be used. In various examples, the indicator may include a coffee maker being activated (or finishing a recipe), a microwave being activated (or finishing a recipe), a bar code or RFID reader indicating a food item has been removed from its storage location, or the like.

In some examples, determining the device battery top off charge trigger may include receiving a top off charge command from a user. For example, the device may include a button implemented as a hardware button or as a software selection for the user to command the device to begin a top off charge for the device. In software implementations, such a button may be implemented as a home screen option or it may be implemented as a sub-option within a menu option (e.g., the user may select the top off charge by selecting "System", then "Battery", then "Top Off Charge", or the like). Such implementations may offer the advantage of flexibility and control for the device user such that the user may choose when a top off charge may be needed, how aggressively to top off charge the device, and so on.

In some examples, determining the device battery top off charge trigger may include presenting a top off charge query to a display device and receiving an affirmation of the top of charge query from a user. In such examples, the device may present to the user an option to top off charge the device battery. If the user affirms the top off charge query, the device may provide the top off charge as discussed herein. If the user rejects the top off charge query, the device may maintain at the less than full charge. In various examples, the top off charge query may be determined in any manner as discussed herein with respect to determining the top off charge trigger. In other examples, the top off charge query may be provided to the user at the time the device and the power source are coupled. Such implementations may offer the advantages of allowing control for the user and a reminder to the user that a top off charge may be available.

In some examples, two or more device battery top off triggers may be determined during the same device recharge. Such triggers may be considered compound triggers. In such examples, a confidence parameter may be associated with each trigger and the trigger having the highest confidence level may be used to determine the implemented trigger. For example, a device sensing lights being turned on may provide a first trigger, sensing a refrigerator door opening may provide a second trigger, and sensing car keys being moved may provide a third trigger. In this example, the third trigger may have a higher confidence level and may be used to implement the top off charge. In other examples, the compound triggers may be used in conjunction to provide a top off trigger. For example, the trigger (or top off charge parameters related to the trigger) for the lights being turned on may be refined by the trigger related to the refrigerator door opening to provide a composite trigger. The trigger related to the keys moving may provide even further refinement. In such examples, multiple triggers may be combined to provide a more accurate composite top off trigger. In some examples, a trigger may have a priority such that no matter what other pending triggers may be available, the top off charge may be immediately responsive to the priority trigger. In the above example, a sensing of keys moving may provide such an impending removal from a charger that an immediate trigger to begin top off may be sent without regard to a pending composite trigger related to the lights and refrigerator. Method 400 may continue at block 430.

At block 430, "Provide a Top Off Charge to the Device Battery in Response to the Top Off Charge Trigger", a top off charge may be provided. In general, the top off charge may be provided using any suitable techniques. In some examples, the top off charge may be implemented by a battery management system or a power management system of the device. In some examples, the battery management system or power management system may determine the actual state of charge of the device battery. In some examples, the top off charge may begin to ramp the battery to full or substantially full charge and maintain that charge until the device is removed from the charger. In such examples, the top off charge may be of any suitable duration. In examples where the battery is brought to a full or substantially full charge, the battery may take a duration in the range of about 8 to 20 minutes to go from the less than full charge state to the full or substantially full state. In some examples, the duration may be about 10 to 15 minutes. In some examples, a less than full charge may be provided. In some examples a 1 to 5 minute top off charge may be provided. In some examples, the device may increase the current to the battery to provide the top off charge. In some examples, the charge provided may "bump" the charge of the battery from the previously provided less than full charge and the charge provided may therefore be considered a bump charge. In some examples, at completion of the top off charge, a notification may be provided at the device via the device display or speaker, or the like.

In some examples, the device battery may not be brought to a full or substantially full state but instead the device battery may be brought to a charge that is greater than the less than full charge at which the battery had been maintained. In some examples, the battery may be brought to a charge in the range of about 90 to 95% of full charge. In some examples, the battery may be brought to a charge in the range of about 95 to 98% of full charge. In some examples, the top off charge may be provided for a predetermined duration. Such techniques may offer the advantage of ease of use. In some examples, the top off charge may be provided for a duration in the range of about 8 to 12 minutes. In some examples, the top off charge may be provided for a duration in the range of about 12 to 18 minutes.

As discussed, in some examples, providing a less than full charge to the device battery (as discussed with respect to block 410) may be completed before or while the top off charge trigger may be determined (as discussed with respect to block 420). In other examples, the order of those actions may be reversed such that the top off trigger may be determined before the less than full charge is provided to the device battery. In some examples, a device top off trigger may be determined each time the device is recharged. In other examples, the device trigger may have been previously determined and the top off trigger may be retrieved each time the device is recharged.

As discussed, the battery management techniques discussed herein may offer a tradeoff between having a fully or substantially fully recharged battery and maintaining a useful lifetime of the battery. In some examples, the aggressiveness of the top off charging may be managed by how full of a charge may be provided to the battery during the top off charge. For example, an 85% of full top off charge may provide minimal battery aging, a 90% of full top off charge may provide a medium or mid-level of battery aging, a 95% of full top off charge may provide a high battery aging, and a 100% full top off charge may provide a maximum battery aging. In other examples, aggressiveness of the top off charging may be managed by how frequently top off charges may be performed. In some examples, both the level of top off charging and the top off charging frequency may be altered together to manage the recharge/battery lifetime tradeoff.

In some examples, the top off charge aggressiveness, level or frequency may be implemented as a user setting or settings. In some examples, the top off charging may be decreased as the battery gets older to maintain the lifetime of the battery. In some examples, the top off charging may be increased as an end of a device service contract nears its end. Since many devices may be replaced at contract renewal, such implementations may provide more recharge durations for the user while the battery life loss problem may not cause a problem since the device may soon be replaced. In some examples, the battery may be top off charged to a full or substantially full charge once or twice per day, while at other recharges, no top off charge may be provided.

In some examples, the aggressiveness of the top off charge may be determined based on a confidence in the prediction of the top off trigger. In some examples, over time the top off trigger may be evaluated for accuracy. In other examples, the technique used to determine the top off trigger may indicate how accurate the trigger may be. For example, a destination based trigger may be more reliable than a prediction based on a sensed change in lighting. In some examples, for more accurate or reliable triggers, a greater top off charge level may be used. In some examples, the confidence in the prediction may be expressed as a time window of expected device removal. For smaller time windows, a greater top off charge may be provided, while for larger time windows a lesser top off charge may be provided. For example, if the window is about 2 to 5 minutes a 95 to 100% top off charge may be provided while if the window is about 40 to 60 minutes, a 88 to 95% top off charge may be provided.

Figure 5:
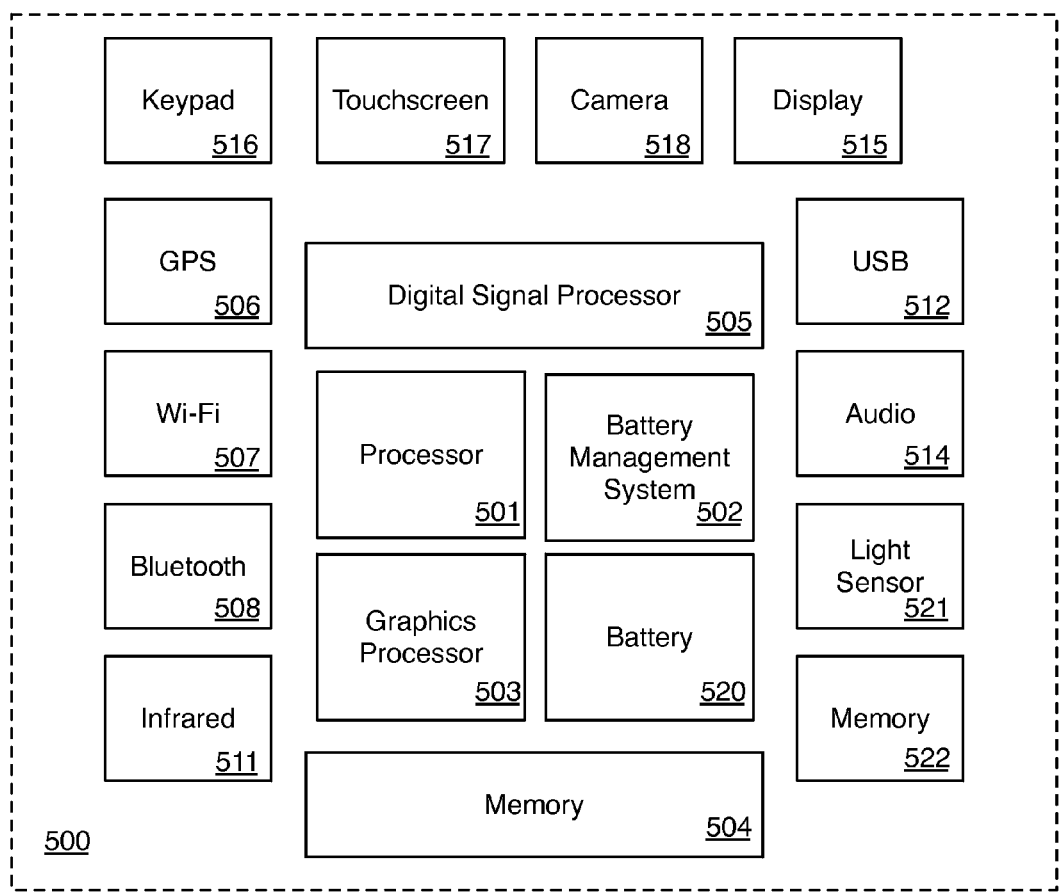
FIG. 5 is an illustration of a block diagram of an example device that may provide battery management.

FIG. 5 is an illustration of a block diagram of an example device 500 that may provide battery management, arranged in accordance with at least some embodiments of the present disclosure. In general, device 500 may be any suitable device. In some examples, device 500 may be a mobile phone, a smartphone, a tablet device, a laptop computer, a global positioning system (GPS) device, an electronic watch, or the like. As shown in FIG. 5, device 500 may include a variety of components that may be powered by a battery 520. In general, device 500 may include some or all of the components shown in FIG. 5. As shown, device 500 may include a processor 501. In some examples, device 500 may include two or more processors. Device 500 may also include a graphics processor 503, a memory 504 and a digital signal processor 505. In general, processor 501, graphics processor 503, memory 504 and digital signal processor 505 may provide core functionality for device 500.

As illustrated in FIG. 5, device may also include a battery management system 502 which may provide the battery management functionality discussed herein. In some examples, battery management system 520 may include a hardware implementation of the power management functionality discussed herein. In some examples, the battery management system may be implemented as a part of a power management system of device 500. In some examples, the battery management techniques discussed herein may be provided at device 500 for battery 520. In some examples, the top off trigger methods discussed herein may be provided by processor 502. In some examples, data related to the top off trigger methods and charging techniques discussed herein may be stored in memory 504 and accessed for processing by processor 501.

As shown, device 500 may also include one or more of a global positioning system 506, a Wi-Fi subsystem 507, an Infrared port 511, a Uniform Serial Bus (USB) port 512, an audio subsystem 514, a light sensor 521, a memory subsystem 522, a Bluetooth radio 508, a keyboard subsystem 516, a touchscreen subsystem 517, a display subsystem 515, or a camera subsystem 518. Device 500 may also include one or more bridges and/or bridge portions for providing communication between the components of device 500, which are not shown for the sake of clarity. The components of device 500 may be provided in any suitable manner. In some examples, various components of device 500 may be provided on the same substrate in a system-on-a-chip implementation. In some examples, various device components may be provided as discrete components, chipsets, or the like. The discrete components may be provided on a printed circuit board or other suitable substrate.

As discussed, device 500 may operate using the battery management techniques discussed herein to provide a top off charge for battery 520 while substantially maintaining a usable battery life of battery 520. In some examples, a top off charge trigger may be based on a detected event at device 500. In some examples, the event may be detected via light sensor 521. For example, device 500 may detect or sense lights turning on in a room via light sensor 521. In some examples, device 500 may detect or sense a sound via a microphone of audio system 514. For example, device 500 may detect an alarm sounding via audio system 514. In some examples, device 500 may provide a top off charge trigger based on the device being within proximity of an intended destination. In such examples, positioning data may be provided from global positioning system 506 to memory 504 for use by processor 501 such that the approximated position of device 500 may be compared with the intended destination.

In some examples, the top off charge trigger may be provided by a user command. In such examples, the user may provide the top off charge command via keypad subsystem 516, touchscreen subsystem 517, or a microphone of audio subsystem 514, or the like. In some examples, the top off trigger may be provided in response to a user affirmation of a top off charge query. In such examples, the top off charge query may by provided to the user via touchscreen subsystem 517, display 515, a speaker of audio subsystem 514, or the like. The user may affirm the query via keypad subsystem 516, touchscreen subsystem 517, or a microphone of audio subsystem 514, or the like.

In some examples, the top off trigger may be provided based on a received indicator from a networked or communicatively coupled device. In such examples, the top off trigger may be received via Wi-Fi subsystem 507, Bluetooth radio 508, USB port 512, Infrared port 511, or the like. As discussed herein, in some examples, the battery management techniques discussed herein may be provided by a smart charger or a charging device to which device 500 may be connected. In such examples, battery management system 502 may not be provided. In some examples, the smart charger or charging device may be coupled to a charge port (not shown) or another port of device 500 such as, for example, USB port 512.

FIG. 6 illustrates an example computer program product 600, arranged in accordance with at least some embodiments of the present disclosure. Computer program product 600 may include machine readable non-transitory medium having stored therein a plurality of instructions that, when executed, cause the machine to provide device power management according to the processes and methods discussed herein. Computer program product 600 may include a signal bearing medium 602. Signal bearing medium 602 may include one or more machine-readable instructions 604, which, when executed by one or more processors, may operatively enable a computing device to provide the functionality described herein. In various examples, some or all of the machine-readable instructions may be used by the devices discussed herein.

In some implementations, signal bearing medium 602 may encompass a computer-readable medium 605, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). In some examples, signal bearing medium 602 may encompass a machine readable non-transitory medium.

Figure 7:
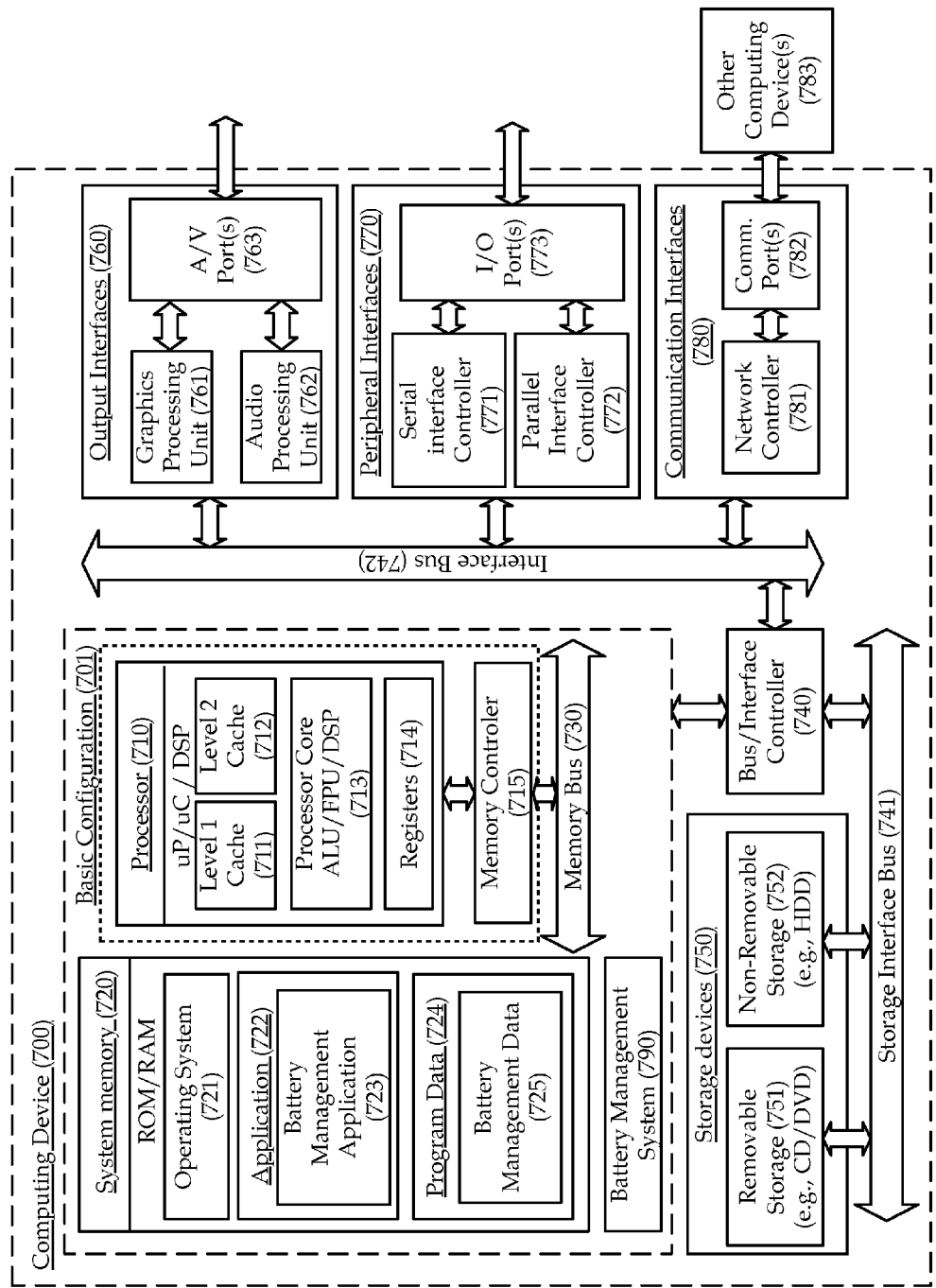
FIG. 7 is an illustration of a block diagram of an example computing device, all arranged in accordance with at least some embodiments of the present disclosure.

FIG. 7 is a block diagram illustrating an example computing device 700, arranged in accordance with at least some embodiments of the present disclosure. In various examples, computing device 700 may be configured to provide the device battery management operations discussed herein. In various examples, computing device 700 may be implemented as the device containing the managed battery, a smart charger connected to a device containing the managed battery, or a device to which a device containing the managed battery may be connected. In an example, the devices discussed with respect to FIG. 5 may be provided as a part of computing device 700. In one example basic configuration 701, computing device 700 may include one or more processors 710 and system memory 720. A memory bus 730 can be used for communicating between the processor 710 and the system memory 720. In some examples, basic configuration 701 may include a battery management system 790. Battery management system 790 may include a hardware implementation of the power management techniques discussed herein. In some examples, battery management system 790 may implemented as a portion of a power management system of computing device 700.

Depending on the desired configuration, processor 710 may be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include compiler application 723 that can be arranged to perform the functions, actions, and/or operations as described herein including the functional blocks, actions, and/or operations described herein. Program Data 724 may include battery management data 725 for use with battery management application 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more NV ports 763. Example peripheral interfaces 780 may include a serial interface controller 781 or a parallel interface controller 782, which may be configured to communicate with external devices such as input devices (e.g., keyboard, mouse, pen, voice input device, touch input device, etc.) or other peripheral devices (e.g., printer, scanner, etc.) via one or more I/O ports 783. An example communication interface 780 includes a network controller 781, which may be arranged to facilitate communications with one or more other computing devices 783 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for providing battery management for a device, the device having a device battery and being electrically coupled to a device charger, comprising:
   charging the device battery to a less than full charge using the device charger;
   determining a device battery top off charge trigger associated with the device and the device battery;
   maintaining the less than full charge until a top off charge is to be provided; and
   providing the top off charge to the device battery in response to the device battery top off charge trigger.

2. The method of claim 1, wherein the determining the device battery top off charge trigger comprises predicting a removal time of the device from the device charger and providing the device battery top off charge trigger at a time before the predicted removal time of the device.

3. The method of claim 2, wherein the predicting the removal time of the device from the device charger comprises predicting the removal time of the device based at least in part on a previous removal time of the device from the device charger.

4. The method of claim 1, wherein the determining the device battery top off charge trigger comprises receiving an indicator at a device sensor.

5. The method of claim 4, wherein the device sensor comprises at least one of a light sensor or a microphone.

6. The method of claim 1, wherein the determining the device battery top off charge trigger comprises receiving an indicator from a networked device communicatively coupled with the device.

7. The method of claim 6, wherein the networked device comprises a ubiquitous computing device.

8. The method of claim 6, wherein the networked device comprises at least one of a refrigerator, a coffee maker, a microwave, a kitchen appliance, a bar code reader, or a radio-frequency identification (RFID) reader.

9. The method of claim 1, wherein the determining the device battery top off charge trigger comprises receiving a top off charge command from a user.

10. The method of claim 1, wherein the determining the device battery top off charge trigger comprises presenting a top off charge query to a display device and receiving an affirmation of the top of charge query from a user.

11. The method of claim 1, wherein the determining the device battery top off charge trigger is performed by at least one of a hardware module of the device or an operating system of the device.

12. The method of claim 1, wherein the device battery comprises at least one of a lithium-ion battery, a lithium-ion polymer battery, a nickel-metal hydride battery or a nickel-cadmium battery.

13. The method of claim 1, wherein the device comprises at least one of a laptop computer, a smartphone or a tablet device.

14. A machine readable non-transitory medium having stored therein instructions that, when executed, cause the machine to provide battery management by:
   charging a device battery to a less than full charge using the device charger electrically coupled to a device;
   determining a device battery top off charge trigger associated with the device and the device battery;
   maintaining the less than full charge until a top off charge is to be provided; and
   providing the top off charge to the device battery in response to the device battery top off charge trigger.

15. The machine readable non-transitory medium of claim 14, wherein the determining the device battery top off charge trigger comprises predicting a removal time of the device from the device charger based at least in part on a previous removal time of the device from the device charger and providing the device battery top off charge trigger at a time before the predicted removal time of the device.

16. The machine readable non-transitory medium of claim 14, wherein the determining the device battery top off charge trigger comprises receiving an indicator at a device sensor.

17. The machine readable non-transitory medium of claim 14, wherein the determining the device battery top off charge trigger comprises receiving an indicator from a networked device communicatively coupled with the device.

18. The machine readable non-transitory medium of claim 17, wherein the networked device comprises at least one of a refrigerator, a coffee maker, a microwave, a kitchen appliance, a bar code reader, or a radio-frequency identification (RFID) reader.

19. The machine readable non-transitory medium of claim 14, wherein the determining the device battery top off charge trigger comprises receiving a top off charge command from a user.

20. The machine readable non-transitory medium of claim 14, wherein the determining the device battery top off charge trigger comprises presenting a top off charge query to a display device and receiving an affirmation of the top of charge query from a user.

21. A device comprising:
   a device battery;
   a device charger configured to be electrically coupled to the device;

a machine readable medium having stored therein instructions that, when executed, cause the device to provide battery management by:
  charging the device battery to a less than full charge using the device charger;
  determining a device battery top off charge trigger associated with the device and the device battery;
  maintaining the less than full charge until a top off charge is to be provided; and
  providing a top off charge to the device battery in response to the device battery top off charge trigger; and
a processor coupled to the machine readable medium to execute the plurality of instructions.

22. The device of claim 21, wherein the determining the device battery top off charge trigger comprises predicting a removal time of the device from the device charger based at least in part on a previous removal time of the device from the device charger and providing the device battery top off charge trigger at a time before the predicted removal time of the device.

23. The device of claim 21, wherein the determining the device battery top off charge trigger comprises receiving an indicator at a device sensor.

24. The device of claim 21, wherein the determining the device battery top off charge trigger comprises receiving an indicator from a networked device communicatively coupled with the device.

25. The device of claim 21, wherein the determining the device battery top off charge trigger comprises receiving a top off charge command from a user.

26. The device of claim 21, wherein the determining the device battery top off charge trigger comprises presenting a top off charge query to a display device and receiving an affirmation of the top of charge query from a user.

27. The device of claim 21, wherein the device battery comprises at least one of a lithium-ion battery, a lithium-ion polymer battery, a nickel-metal hydride battery or a nickel-cadmium battery.

28. The device of claim 21, wherein the device comprises at least one of a laptop computer, a smartphone or a tablet device.

29. A method for a smart charger to provide battery management for a battery coupled to the smart charger comprising:
  charging the battery to a less than full charge using the smart charger;
  determining a battery top off charge trigger associated with the battery;
  maintaining the less than full charge until a top off charge is to be provided; and
  providing a top off charge to the battery in response to the battery top off charge trigger.

30. A method for a device to provide battery management to a charging device electrically coupled to the device comprising:
  charging a battery of the charging device to a less than full charge using the charging device;
  determining a battery top off charge trigger associated with the charging device and the battery;
  maintaining the less than full charge until a top off charge is to be provided; and
  providing a top off charge to the battery in response to the device battery top off charge trigger.

* * * * *

UNITED STATES PATENT AND TRADEMARK OFFICE
CERTIFICATE OF CORRECTION

PATENT NO. : 8,941,363 B2  
APPLICATION NO. : 13/264710  
DATED : January 27, 2015  
INVENTOR(S) : Kruglick Page 1 of 2

It is certified that error appears in the above-identified patent and that said Letters Patent is hereby corrected as shown below:

In the Drawings

In Fig. 7, Sheet 5 of 5, delete "uP/uC/ DSP" and insert -- μP/μC/ DSP --, therefor.

In Fig. 7, Sheet 5 of 5, in Box "(715)", in Line 1, delete "Memory Controler" and insert -- Memory Controller --, therefor.

In the Specification

In Column 1, below Title, insert -- CROSS-REFERENCE TO RELATED APPLICATIONS
The present application is a U.S. national stage filing under 35 U.S.C. §371 of International Application No. PCT/US2011/038353, filed on May 27, 2011. --.

In Column 6, Line 19, delete "device 355" and insert -- device 350 --, therefor.

In Column 9, Line 24, delete "top of" and insert -- top off --, therefor.

In Column 11, Line 51, delete "system 520" and insert -- system 502 --, therefor.

In Column 11, Line 58, delete "processor 502." and insert -- processor 501. --, therefor.

In Column 12, Line 38, delete "may by" and insert -- may be --, therefor.

In Column 13, Line 5, delete "medium 605," and insert -- medium 606, --, therefor.

In Column 14, Line 38, delete "NV ports" and insert -- A/V ports --, therefor.

Signed and Sealed this  
Thirtieth Day of June, 2015

Michelle K. Lee  
*Director of the United States Patent and Trademark Office*

CERTIFICATE OF CORRECTION (continued)
U.S. Pat. No. 8,941,363 B2

In Column 14, Line 39, delete "780 may include a serial interface controller 781" and insert -- 770 may include a serial interface controller 771 --, therefor.

In Column 14, Line 40, delete "controller 782," and insert -- controller 772, --, therefor.

In Column 14, Line 44, delete "ports 783." and insert -- ports 773. --, therefor.

In Column 15, Line 60, delete "and or" and insert -- and/or --, therefor.

In the Claims

In Column 18, Line 12, in Claim 10, delete "top of" and insert -- top off --, therefor.

In Column 18, Line 62, in Claim 20, delete "top of" and insert -- top off --, therefor.

In Column 20, Line 2, in Claim 26, delete "top of" and insert -- top off --, therefor.